United States Patent Office 3,740,410
Patented June 19, 1973

3,740,410
ACID ADDITION SALTS OF 2,3,5,6-TETRAAMINO-PYRIDINE AND A PROCESS FOR THEIR PREPARATION
Arthur H. Gerber, Cleveland, Ohio, assignor to Horizons Incorporated, a Division of Horizons Research Incorporated
No Drawing. Filed Nov. 23, 1970, Ser. No. 92,154
Int. Cl. C07d 31/42
U.S. Cl. 260—295 S  5 Claims

ABSTRACT OF THE DISCLOSURE

Processes for the preparation of 2,6-diamino-3,5-dinitropyridine from 2,6-diaminopyridine and catalytic reduction of this dinitropyridine to 2,3,5,6-tetraaminopyridine free base and acid salts thereof, and processes for preparing polymers from said pyridines.

NATURE OF THE DISCLOSURE

This invention relates to the preparation of tetrakis [nitrogen-functionally substituted] pyridines and to polymers based on said pyridines. More specifically, it relates to the preparation of 2,6-diamino-3,5-dinitropyridine and its derivatives, as represented by the formula below:

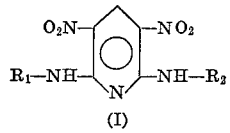

(I)

wherein each of $R_1$ and $R_2$ may represent

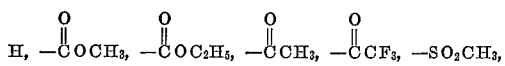

and similar monovalent groups, and $R_1$ and $R_2$ need not be identical; and to the preparation of 2,3,5,6-tetraaminopyridine whose formula is:

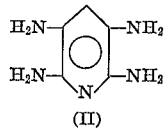

(II)

and of its acid salts.

The diaminodinitropyridines identified by (I) above are convenient precursors to the tetraaminopyridine identified by (II) above. Bis-o-diamines, of which 2,3,5,6-tetraaminopyridine is one example, have important utilities as monomers for the preparation of polybenzimadazoles, polyimidazopyrrolones (or pyrrones), polybenzimidazobenzophenanthrolines and polyquinoxalines. Polyquinoxalines can be prepared by reaction of bis-o-diamines with either 2,5-dihydroxy-p-benzoquinone or bis-glyoxals. Many members of these classes of polymers have outstanding thermal and radiation resistance making them particularly suitable for aerospace applications. Such polymers can often be used to form films and fibers with outstanding chemical and physical properties and are useful in the formulation of protective coatings, in laminating and adhesive formulations, composites, and the like. Polymers derived from 2,3,5,6-tetraaminopyridine show improved thermal stability in air in comparison to benzenoid bis-o-diamine derived polymers.

Recently 2,3,4,6-tetraaminopyridine has been reported in the literature. However, since it is not a bis-o-diamine it is unsuitable for the preparation of the aforementioned polymers. Other areas of utility for bis-o-diamines include pharmaceuticals and hair dyeing.

The 2,3,5,6-tetraaminopyridine free base (II) is susceptible to oxidation and is generally prepared and used as its acid salt. Preferred acids for converting the free base to its acid salt include hydrogen chloride, hydrogen bromide, sulfuric acid, trifluoroacetic acid, trichloroacetic acid, and methanesulfonic acid, but many other acids are suitable as will be readily appreciated by any chemist. The 2,3,5,6-tetraaminopyridine free base is preferably prepared by reduction of 2,6-diamino-3,5-dinitropyridine, the compound (I) in which both $R_1$ and $R_2$ are —H.

The compound 2,6-diamino-3,5-dinitropyridine (i.e. compound I wherein both $R_1$ and $R_2$ are —H) is preferably prepared by direct nitration of 2,6-diaminopyridine. This is in marked constrast to the preparation of the appropriate diaminodinitrobenzene precursors to 1,2,4,5-benzenetetramine which cannot be conveniently prepared in pure form directly from a diaminobenzene. The compound 2,6-diamino-3,5-dinitropyridine can also be prepared from a derivative of 2,6-diaminopyridine by nitration with subsequent hydrolysis. Suitable derivatives of the 2,6-diaminopyridine can be obtained by acetylation, p-nitrobenzoylation, sulfonamide-, or urethane- formation of 2,6-diaminopyridine. Such reactions and derivatives are well known to those skilled in the art, hence will not be discussed in detail.

Dinitro-diaminopyridines of Formula I in which neither of $R_1$ and $R_2$ is —H, can be converted to 2,3,5,6-tetraaminopyridine by reaction with ammonia (or an ammonia source) or with hot aqueous acid followed by hydrogenation. The former method is preferred. Ammonolysis when $R_1$ or $R_2$ is —$SO_2CH_3$ or

is not desirable, hence acidic hydrolysis is the method of choice. An alternate route, which is less preferable, comprises the reduction of substituted diaminodinitropyridines to a 3,5-diamino - 2,6 - disubstituted pyridine which can then be hydrolyzed with hot aqueous acid to the tetraaminopyridine. This route is preferred when the amino nitrogen is substituted with

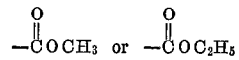

The preferred preparation of 2,6-diamino-3,5-dinitropyridine by the nitration of 2,6-diaminopyridine comprises addition of a nitrating source to a well-stirred solution of the 2,6-diaminopyridine in concentrated sulfuric acid or in a mixture of sulfuric acid and acetic acid. The nitrating source can be, but is not restricted to, 90–100% nitric acid, red fuming nitric acid, sodium or potassium nitrate. The amount of nitrating species can range from the stoichiometric quantity to 100% excess. Temperatures for the nitration can range from —15° C. to 35° C., but are preferably in the —15 to +5° C. range. When the nitration is essentially complete, the product is simply isolated by precipitation into chilled water or other chilled aqueous solvent or by dilution of the nitration mixture. The product obtained by direct nitration of 2,6-diaminopyridine is usually subjected to purification by methods known to those skilled in the art prior to reduction.

Nitration of (I) particularly when $R_1$ and $R_2$ are both selected from —$SO_2CH_3$,

is considerably slower than the case where $R_1$ and $R_2$ are both —H or even the case where $R_1$ and $R_2$ are both

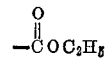

Essentially the same nitration procedure is employed for these less reactive substituents except that higher temperatures are used, preferably 40–80° C.

With respect to the reduction of 2,6-diamino-3,5-dinitropyridine, it is desirable to have high purity dinitro intermediate. Such material is usually obtained by ammonolysis of substituted 2,6-diamino-3,5-dinitropyridines of Formula I, or by rigorous purification of the product from direct nitration of 2,6-diaminopyridines.

The reduction can be carried out chemically or catalytically, but the latter is preferred. Chemical agents such as stannous chloride often lead to contamination of product. Catalytic reductions may be performed with platinum, platinum oxide, or palladium catalysts, and the catalysts may be on a support such as charcoal or barium sulfate. The amount of catalyst may vary greatly depending upon solvent and reaction temperatures, but is generally in the range of 0.5 to 10% by weight based on the diaminodinitropyridine, the preferred range being 1–5%. Solvents for the reduction may be inorganic or organic or mixtures thereof. For example, pyridine, alcohol, sulfuric acid in acetic acid, phosphoric acid, phosphoric acid in acetic or formic acid and phosphoric acid in alkanols are all suitable solvents for the reduction.

If a non-acidic solvent is used, the tetramine free base can be isolated directly (see Example 8). Suitable non-acidic solvents include lower aliphatic alcohols, methoxyethanol, bis(2-methoxyethyl) ether ("diglyme"), monomethyl ether of diethylene glycol, pyridine, 4-picoline, and others of a similar nature. Organic amines such as pyridine are particularly useful when used as sole solvent or in conjunction with one or more of the aforementioned solvents. Their use leads to an unexpected large increase in reduction rate thus permitting significantly shorter reaction times under a given set of conditions.

If acidic solvents are used, the tetraamine acid salt can be isolated conveniently either admixed with catalyst (Example 6) or as a solution which can then be precipitated by non-solvent containing the appropriate acid (Example 7). For example, reduction in sulfuric acid-acetic acid leads to the sulfuric acid salt of (II) admixed with catalyst. The salt can be freed from catalyst by extraction with water and then precipitated by addition of sulfuric acid. Alternately, the sulfate salt can be dissolved in aqueous hydrochloric acid and the hydrochloride of (II) isolated by saturation with hydrogen chloride. The hydrochloride salt can also be isolated directly from the initial reduction (Example 7).

Other modifications will be apparent to those skilled in the art. Reaction temperatures can vary from 20 to 100° C. and initial hydrogen pressures of 30–1000 p.s.i. can be used. Temperatures of 40–80° C. and hydrogen pressures of 50–200 p.s.i. are preferred.

Since the color and purity of the 2,3,5,6-tetraaminopyridine product are often extremely important, particularly in polymer forming applications, the catalytic method of reduction in acidic media is advantageous in that high purity, light (white to light pink) colored acid salt of the 2,3,5,6-tetraaminopyridine can be directly obtained in good yield.

The following examples are illustrative of preferred embodiments of this invention and are not to be construed as limiting the invention in any way.

EXAMPLE 1

Preparation of 2,6-diamino-3,5-dinitropyridine from 2,6-diaminopyridine

To 250 cc. of concentrated sulfuric acid was added, with chilling and stirring, 54.5 g. (0.5 mole or 1.0 equiv.) of 2,6-diaminopyridine, so that the temperature never rose above 25° C. A solution of 30 cc. sulfuric acid and 76 g. nitric acid [prepared from 47 cc. (75 g.) red fuming nitric acid and 12.9 cc. (18.3 g.) 70% nitric acid] was added to this solution over a two hour period so that the temperature was maintained at $10\pm5°$ C. The resulting dark solution was heated to 70° C. over ¾ hour and maintained at 70° C. for ½ hour. The reaction mixture was cooled and poured into 1.5 liter water, stirred well, and filtered. The solid product was washed well and dried to give 63 g. (63% yield). Elemental analysis is confirmatory. Calculated for $C_5H_5N_5O_4$ (percent): C, 30.2; H, 2.5; O, 32.2. Found (percent): C, 31.7; H, 2.5; O, 32.3. Major peaks appear in the infrared (KBr) at about 2.9, 3.0, 6.2, 6.9, 7.3, 7.5, 7.8, 8.1, 9.6, 13.2 and 14.0$\mu$. Purified product is a golden yellow solid which sinters at about 300° C. and then decomposes at about 355° C. and then decomposes at about 355° C.

EXAMPLE 2

Diethyl 2,6-pyridinedicarbamate

Ethyl chloroformate (171 cc., 195 g. or 1.8 mole) was gradually added to a well stirred mixture of 81.7 g. (0.75 mole=1.5 equiv.) 2,6-diaminopyridine, 207 g. (1.5 mole) anhydrous potassium carbonate, and 450 cc. tetrahydrofuran:N,N-dimethylformamide 5:2 v./v. Temperature during addition was 22–40° C. An additional 69 g. carbonate and 50 cc. chloroformate were added and the temperature maintained at 45–50° C. for 1 hour, during which significant carbon dioxide evolution occurred. The mixture was poured into 1 liter of cold water, and then 150 cc. conc. hydrochloric acid added, and the tetrahydrofuran allowed to evaporate from an open dish overnight. Most of the aqua-colored solid present was separated by decantation. The liquor was acidified with hydrochloric acid to pH 7, concentrated to about half volume, and cooled. Product and salts were filtered off and reslurried twice with water and filtered to remove most of the potassium chloride. The product was extracted from residual inorganic salts with 500 cc. of hot acetone. The product was reprecipitated on addition of 750 cc. of water, combined with previously removed colored solid, and slurried with isopropyl alcohol, filtered, and dried to give 42 g. (22%) light aqua solid, M.P. 124–128° C. Recrystallization from 1:1 v./v. ethanol-water raised the M.P. to 130–132° C.

Analysis.—Calcd. for $C_{11}H_{15}N_3O_4$ (mol. wt. 253) (percent): C, 52.2; H, 5.9; N, 16.6. Found (percent): C, 51.6; H, 5.8; N, 16.5.

The above product can also be obtained in tetrahydrofuran solvent using a tertiary amine (e.g., pyridine, triethylamine) as acid acceptor. Dimethyl 2,6-pyridinedicarbamate is obtained by the use of methyl chloroformate in place of the ethyl chloroformate.

EXAMPLE 3

Diethyl ester of 3,5-dinitro-2,6-pyridinedicarbamic acid, (I) in which both $R_1$ and $R_2$ are

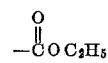

To a solution of 25.3 g. (0.1 mole) diethyl 2,6-pyridinedicarbamate in 125 cc. conc. sulfuric acid at 0–6° C. was added, over 1 hour, a solution of 100% nitric acid (0.4 mole or 100% excess) in acetic acid. The nitrating solution was prepared by gradually adding 14 cc. of acetic anhydride to 19 cc. of fuming 90% nitric acid while maintaining the temperature below 0° C. The nitration was completed by stirring 1 hour at 0–5° C. followed by one hour at 27° C. The reaction solution was poured into ½ liter cold water. The solid product was washed well and dried, yielding 25 g. of dried product. Recrystallization from ethanol gave 21.0 g. (62%), M.P. 160–164° C.

Dimethyl 2,6-pyridinedicarbamate can be similarly nitrated to give (I) in which both $R_1$ and $R_2$ are

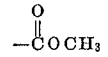

EXAMPLE 4

2,6-diamino-3,5-dinitropyridine

To a solution of 9.0 g. diethyl 3,5-dinitro-2,6-pyridine-dicarbamate in 30 cc. N,N-dimethylformamide was added 10 cc. of conc. ammonia. Within about 5 minutes a massive precipitate formed. Stirring was continued overnight at room temperature. Isopropyl alcohol (50 cc.) was added with good stirring, the product filtered, washed, and dried to give 5.1 g. (97%) yellow solid. Infrared spectra showed no carbonyl absorption. Elemental analysis was as follows: Calcd. for $C_5H_5N_5O_4$ (percent): C, 30.1; H, 2.5; N, 35.1. Found (percent): C, 30.6; H, 2.5; N, 35.7. The infrared spectrum of this product is essentially identical to that from Example 1.

In somewhat similar fashion 2,6 - diamino-3,5-dinitropyridine may be obtained from substituted amines (I) in which $R_1$ and $R_2$ are each selected from the group consisting of —H,

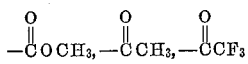

The compounds in which the substituents are

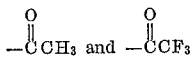

are obtained from 2,6-diaminopyridine by reaction with acetic and trifluoroacetic anhydrides, respectively. Compounds where $R_1$ is hydrogen and $R_2$ is not hydrogen are conveniently prepared by using a large excess of 2,6-diaminopyridine in the initial reaction with the anhydride.

EXAMPLE 5

2,6-diamino-3,5-dinitropyridine by acid hydrolysis

Diethyl 3,5 - dinitro - 2,6-pyridinedicarbamate (9.5 g.) was dissolved in 48 g. conc. sulfuric acid, 20 cc. water were added and the solution heated 4 hours at 110–115° C. The reaction mixture was cooled and poured into 250 cc. cold water with stirring. The solid precipitate was filtered, washed well, and dried to give a quantitative yield of 2,6-diamino-3,5-dinitropyridine.

EXAMPLE 6

2,3,5,6-tetraaminopyridine bis(sulfuric acid salt)

2,6-diamino - 3,5 - dinitropyridine (3.75 g. or 0.0188 mole) was partially dissolved in 60 cc. of 30% sulfuric acid in glacial acetic acid in a 250 cc. Parr bottle. It was stirred well with slight application of heat and 2.1 g. of 5% palladium on barium sulfate added. Reduction with hydrogen was complete (uptake of 9.0 lbs. hydrogen, theoretical is 7.7 lbs. excluding adsorption on catalyst) at ambient temperature within 2 hours. The resulting off-white mixture was diluted with acetic acid and tetrahydrofuran, solids filtered, washed, and dried to give 8.5 g. light grey solid. Of this weight, 2.1 g. was catalyst and very little could be inorganic salt as no precipitate was obtained from the filtrate on addition of ether. The yield of tetraamine bis(sulfuric acid salt) was 6.4 g. (100%). The solid was extracted with 50 cc. of water pre-boiled under nitrogen. Rapid darkening of the liquor was noted. A small amount of dark insoluble solid was filtered off and 13 g. conc. sulfuric acid added to the filtrate to precipitate product. The latter was washed successively with 25% sulfuric acid, acetic acid, and alcohol to give, after drying, 1.2 g. of rust-colored solid. Alcohol washing (2×) and drying of the insolubles led to reclaiming of 5.2 g. dark solid. Elemental analysis of the 1.2 g. material confirmed the tetraamine di(sulfuric acid salt) structure assignment. Calculated for $C_5H_9H_5 \cdot 2H_2SO_4$ (mol. wt.=335) (percent): C, 17.9; H, 3.9; N, 20.9; S, 19.1; O, 38.2. Found (percent): C, 17.8; H, 4.9; N, 20.4; S, 19.0; O (calculated), 37.9 (by difference).

The sulfate salt-catalyst mixture can be freed from catalyst and converted to the trihydrochloride as follows: The solid mixture (17 g.) was stirred well with 100 cc. of 5% hydrochloric acid which had been blown with nitrogen at reflux, filtered hot, cooled and saturated with hydrogen chloride. The purple solid was filtered, washed with alcoholic hydrogen chloride, and vacuum dried to yield 5.8 g. tetraaminopyridine trihydrochloride monohydrate. Calculated for $C_5H_9N_5 \cdot 3HCl \cdot H_2O$ (percent): C, 22.5; H, 5.2; N, 26.2; Cl, 39.9. Found (percent): C, 22.5; H, 5.3; N, 26.5; Cl, 40.2.

In somewhat similar manner using hydrogen bromide the hydrobromide salt is obtained.

EXAMPLE 7

2,3,5,6-tetraaminopyridine hydrochloride salt by reduction in $H_3PO_4$—$HCO_2H$ In a 500 cc. Parr bottle 2,6-diamino-3,5-dinitropyridine (15 g.) was dissolved in 100 cc. hot 85% $H_3PO_4$-methanol, the solution was cooled to 25° C. and diluted with 135 cc. formic acid saturated with hydrogen chloride and 15 cc. concentrated hydrochloric acid. 5% palladium on charcoal (2.88 g.) was added and the mixture placed under 55 p.s.i. hydrogen pressure at room temperature. The reduction was carried out at 75° C. until no further hydrogen uptake was noticed. The mixture was filtered, the solid washed with 50 cc. formic acid containing several cc. of conc. hydrochloric acid, and finally with ethanolic hydrogen chloride. Upon drying, 4.0 g. of black solid was recovered. The filtrate was added to a cold solution of 500 cc. tetrahydrofuran and 50 cc. conc. hydrochloric acid to precipitate off-white 2,3,5,6-tetraaminopyridine hydrochloride salt.

Upon removal of catalyst by filtration and addition of concentrated HCl, a high yield of hydrochloride salt is precipitated. The product of this example can be used to dye hair, as in British Pat. No. 995,870. In somewhat similar fashion, 1,3-diamino-2,4-dinitrobenzene is reduced and isolated as 1,2,4,5-benzenetetramine hydrochloride salt.

EXAMPLE 8

2,3,5,6-tetraaminopyridine free base

To a hot suspension of 15 g. 2,6-diamino-3,5-dinitropyridine in 200 cc. 95% ethanol and 40 cc. pyridine was added 1.5 g. 5% palladium on charcoal. The mixture was subjected to hydrogenation with an initial pressure of 55 p.s.i. at about 60° C. After 20 lbs. of hydrogen were absorbed the temperature was raised to about 75° C. When no further hydrogen uptake (total of 39.4 lbs.) occurred, the reaction mixture was cooled and 50 cc. of benzene-heptane (1:1 by v./v.) was added. The mixture was filtered in a dry box under nitrogen and worked up in the dry box as follows: The filter cake was extracted with 150 cc. of deaerated N,N-dimethylacetamide and filtered. To the filtrate was added 150 cc. of benzene-heptane (1:1 by v./v.) to precipitate product which was washed and vacuum dried to yield 4.3 g. (41%) of green solid. Elemental analysis was as follows: Calculated for $C_5H_9N_5$ (percent): C, 43.2; H, 6.5; N, 50.4. Found (percent): C, 42.3; H, 6.1; N, 48.9. The product is extremely sensitive to atmospheric oxidation.

When the hydrogenation is performed in the absence of pyridine a much slower reduction is observed.

The trichloroacetic acid salt of 2,3,5,6-tetraaminopyridine may be obtained by treating the free base with a cold solution of trichloroacetic acid in acetic acid.

EXAMPLE 9

2,3,5,6-tetraaminopyridine free base

To a hot suspension of 15 g. 2,6-diamino-3,5-dinitropyridine in 200 cc. 95% ethanol and 40 cc. pyridine was added 1.47 g. 3.5% platinum on charcoal. The mixture was subjected to hydrogenation with an initial pressure of 55 p.s.i. at about 65° C. When no further uptake (35.9 lbs. after 1 hour) of hydrogen occurred at this temperature, the reaction mixture was cooled to about −10° C.

and rapidly filtered. The cake was washed with benzene-hexane (1:1 by v./v.) and then placed in a large sublimation apparatus. The system was evacuated and then heated 6 hours at 185–210° C. at .008–.02 mm. mercury, and 0.5 g. of tetraaminopyridine sublimate recovered under nitrogen.

The residue (10.1 g.) from the sublimation was stirred with 70 cc. of 85% phosphoric acid and filtered. To the filtrate was added 100 cc. conc. hydrochloric acid. The mixture was cooled to −10° C. and suction filtered. After washing and vacuum drying, 8.0 g. of hydrochloride salt was recovered as product.

When a stoichiometric quantity of triethylamine is substituted for the pyridine in the above reduction a significantly slower rate of reduction occurs.

EXAMPLE 10

To a well stirred solution at about −10° C., of 54.5 g. (0.5 mol=1.0 equiv.) of 2,6-diaminopyridine in 300 cc. pyridine was added 115 g. (1.0 mol) methanesulfonyl chloride. After ½ hour at this temperature, the dark solution was allowed to warm up to room temperature and kept at this temperature for 1½ hours. Product and hydrochloride salts were precipitated by addition of tetrahydrofuran and washing with tetrahydrofuran (total volume about 1 liter). The insoluble gum was diluted with 250 cc. water and neutralized with conc. ammonia. Water was largely removed from the mixture by rotary evacuation and the wet solid extracted with ½ liter of warm ethanol. The ethanolic liquor was concentrated to 200 cc., cooled to −20° C. and crude product (24 g.) filtered off. Removal of inorganic salt and recrystallization from aqueous ethanol gave 2,6-pyridinedimethanesulfonamide, M.P. 190–194° C.

*Elemental analysis.*—Calculated for $C_7H_{11}N_3O_4S_2$ (M.W. 265) (percent): N, 15.9; S, 24.2. Found (percent): N, 15.9; S, 23.9.

5.0 g. (0.019 mol) of the above 2,6-pyridinedimethanesulfonamide was dissolved in 20 cc. of conc. sulfuric acid and a premixed solution of 4 cc. 90% nitric acid (100% mole excess) and 3 cc. acetic anhydride was added so that the reaction temperature was maintained in the range 20–28° C. The reaction was stirred at room temperature for 1 hour during which it became heterogeneous. Additional sulfuric acid (5 cc.) was added and the mixture heated at 50–55° C. for 1 hour. After cooling to room temperature, it was poured with stirring on 53 g. ice. The yellow solid product was filtered, washed, reslurried with isopropyl alcohol, refiltered and dried to give 4.7 g. (70%), M.P. 275–285° C. This material was dissolved in 15 cc. N,N-dimethylacetamide at 80° C. and then boiling isopropyl alcohol added to initiate precipitation. The mixture was cooled to ice temperature, solid filtered off and dried to give 3.0 g., M.P. 282–286° C.

*Elemental analysis.*—Calculated for $C_7H_9N_5O_8S_2$ (mol. wt. 355) (percent): N, 19.7; S, 18.0. Found (percent): N, 19.4; S, 18.0.

EXAMPLE 11

The monomethanesulfonamide of 2,6-diaminopyridine can be obtained in a reaction similar to that of Example 10 using excess 2,6-diaminopyridine (54.4 g.=1.0 equiv.), 100 cc. pyridine plus 200 cc. tetrahydrofuran as solvent and 22.9 g. (0.2 mol) methanesulfonyl chloride. The product is isolated by removing tetrahydrofuran and pyridine, neutralizing the residue and removing excess 2,6-diaminopyridine.

The above product upon reaction with ethyl chloroformate; or acetic anhydride (or acetyl chloride); and subsequent nitration affords (I) in which $R_1$ is $-SO_2CH_3$ and $R_2$ is

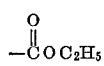

and in which $R_1$ is $-SO_2CH_3$ and $R_2$ is

respectively.

EXAMPLE 12

Heterocyclic polymer from 2,3,5,6-tetraaminopyridine and 1,4,5,8-naphthalenetetracarboxylic acid To a 500 cc. 3-necked flask fitted with a Trubore stirrer and nitrogen inlet was added 333 g. 116% polyphosphoric acid. The polyphosphoric acid was deoxygenated by heating overnight at 110° C. with nitrogen bubbling through the stirred acid. Then, at 75° C., was added 3.32 g. (0.0133 mole) of 2,3,5,6-tetraaminopyridine trihydrochloride and the solution heated at 75–80° C. overnight under nitrogen to expel hydrogen chloride. To this solution was added 4.05 g. (0.0133 mole) 1,4,5,8-naphthalenetetracarboxylic acid and the mixture slowly heated to 180° C. and maintained at that temperature for 10 hours. The hot viscous solution was slowly poured with good stirring into 1.5 liter of pre-chilled (ca. −20° C.) methanol. The polymer was washed well with methanol and then dried at 190–200° C. under reduced pressure to yield 3.4 g. (76%) dark solid. The polymer was further purified by dissolving 2 g. in 50 cc. of methanesulfonic acid and reprecipitating into methanol. The precipitate was washed well with methanol and then methanol containing ammonia and water and finally dried 6 hours at 230–250° C. at 0.05–0.1 mm. mercury to afford 1.5 g. of product (75% recovery).

*Analysis.*—Calculated for $C_{19}H_5N_5O_2$ (equiv. wt. 335) (percent): C, 68.0; H, 1.5; N, 20.9. Found (percent): C, 66.2; H, 2.2; N, 19.3; ash, 0.3.

The extreme thermal stability of this polymer is illustrated by the following experiment. The polymer (0.12 g.) was placed in an open 10 cc. porcelain crucible and heated with a burner (flame temperature immediately below the crucible was 1000–1100° C.). It took over 2 hours for complete (98%) combustion to occur.

Essentially the same polymer is obtained by replacing the naphthalenetetracarboxylic acid with an equivalent amount of 1,4,5,8-naphthalenetetracarboxylic acid dianhydride in the initial polymerization. The resulting product also exhibited good thermal stability.

EXAMPLES 13–22

When the procedure of Example 12 is repeated using each of the following tetraacids (or corresponding dianhydrides) instead of 1,4,5,8-naphthalenetetracarboxylic acid, the corresponding polyheterocycles are obtained.

(13) 1,2,4,5-benzenetetracarboxylic acid
(14) 1,2,4,5-cyclohexanetetracarboxylic acid
(15) 2,3,6,7-naphthalenetetracarboxylic acid
(16) 3,3′,4,4′-benzophenonetetracarboxylic acid
(17) bis(3,4-dicarboxyphenyl)sulfone
(18) bis(3,4-dicarboxyphenyl)ether
(19) 3,6-dichloro-1,2,4,5-benzenetetracarboxylic acid
(20) 2,3,6,7-anthraquinonetetracarboxylic acid
(21) 2,3,5,6-pyridinetetracarboxylic acid
(22) 2,3,5,6-pyrazinetetracarboxylic acid

EXAMPLE 23

Polyheterocycle from 2,3,5,6-tetraaminopyridine and 1,4,5,8-naphthalenetetraacid dianhydride Under an inert atmosphere 1.07 g. (4 mmole) of 1,4,5,8-naphthalenetetracid dianhydride is added to a solution of 0.556 g. (4 mmole) 2,3,5,6-tetraaminopyridine in 10 cc. dry N,N-dimethylacetamide (purified and deaerated). The last 5% of the dianhydride is added as a solution in the same solvent. Reaction at ambient temperature leads to the intermediate amine substituted polyamide-acid which can be isolated by precipitation into acetonitrile, washing and drying at mild temperatures. The polymer of Example 12 can be obtained by using the above solution to cast a film which after drying at 150–400° C. affords the cyclized polymer.

In similar fashion, the corresponding dianhydrides of Examples 13–22 can be used.

EXAMPLE 24

Polybenzimidazole from 2,3,5,6-tetraaminopyridine and isophthalic acid

A 500 cc. 3-necked flask equiped with a Trubore stirrer, nitrogen inlet, and calcium chloride drying tube was charged with 240 g. of 116% polyphosphoric acid. The acid was deaerated by sweeping with a strong current of nitrogen at 110–120° C. for 2 hours. Upon cooling to 60° C. 4.96 g. (0.020 mole) 2,3,5,6-tetraaminopyridine trihydrochloride was added in two portions and the temperature gradually raised to 120° C. to expel hydrogen chloride. Isophthalic acid (3.32 g. or 0.020 mole) was then added and the polymerization carried out at about 180° C. for 20 hours. The hot dark brown solution was gradually poured, with good stirring, into 1 liter of aqueous methanol (1:1 by v./v.) which had been chilled to −10° C. The polymer was washed well with water and aqueous methanol containing ammonia and vacuum dried at 200–220° C. to afford 4.4 g. (94%) very dark solid. The polymer was redissolved in 75 cc. warm 85% phosphoric acid, 100 cc. acetic acid added and the solution poured into 500 cc. water, washed as above and dried to give 3.5 g. solid. This polymer was resubjected to fresh hot polyphosphoric acid (100 g.) under nitrogen at 220–225° C. for 4½ hours. The polymer was precipitated into aqueous-acetic acid and worked up as above to recover 3.1 g.

*Elemental analysis.*—Calculated for $C_{13}H_7N_5$ (equiv. wt. 233) (percent): C, 66.9; H, 3.0; N, 30.1. Found (percent): C, 64.9; H, 3.3; N, 28.5.

In similar fashion essentially the same polymer may be obtained by using dimethyl isophthalate or the diamide of isophthalic acid.

EXAMPLES 25–34

When the procedure of Example 24 is repeated using each of the following dibasic acids instead of isophthalic acid (as free acid or as the dimethyl ester or diamide), the corresponding polybenzimidazole is produced.

(25) terephthalic acid
(26) 2,6-naphthalenedicarboxylic acid
(27) 4,4′-biphenyldicarboxylic acid
(28) 4,4′-diphenyloxidedicarboxylic acid
(29) 4,4′-benzophenonedicarboxylic acid
(30) bis-(4-carboxyphenyl)sulfone
(31) 3,5-pyridinedicarboxylic acid
(32) 2,5-pyrazinedicarboxylic acid
(33) 2,7-anthraquinonedicarboxylic acid
(34) 1,4-cyclohexanedicarboxylic acid

EXAMPLE 35

Polyquinoxaline from 2,3,5,6-tetraaminopyridine trihydrochloride and 2,5-dihydroxy-p-benzoquinone A solution of 0.0133 mole of tetraaminopyridine in 300 g. polyphosphoric acid was prepared from trihydrochloride salt as in Example 12. To this solution was added 1.86 g. (0.0133 mol) 2,5-dihydroxy-p-benzoquinone and the reaction mixture heated at 150° C. for 12 hours. The polymer was isolated in high yield by precipitation, thorough washing with dilute ammonia and drying.

EXAMPLE 36

Polyheterocycle from 2,3,5,6-tetraaminopyridine trihydrochloride and trimellitic anhydride acid chloride To a solution of 0.01 mole 2,3,5,6-tetraaminopyridine trihydrochloride in 200 g. deaerated polyphosphoric acid was added, under an inert atmosphere, 2.10 g. (0.01 mole) of trimellitic anhydride monoacid chloride. The addition was made at about 100° C. and then the reaction temperature gradually raised to 180° C. and kept there for 15 hours. The polymer was isolated in good yield in a manner similar to that described in Example 12. Its infrared spectrum showed imide bands at about 5.7μ and 13.9μ and imidazole at about 6.2μ.

Similar polymer is obtained by using trimellitic acid or trimellitic anhydride in place of trimellitic anhydride monoacid chloride as in Example 36.

EXAMPLES 37–44

When the procedure of Example 36 is repeated, replacing trimellitic anhydride acid chloride by the anhydride acid chlorides derived from tribasic acids of the following general formula

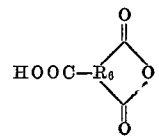

where $R_6$ is a trivalent organic radical, whereby the following corresponding polyheterocycles are obtained.

(37) 1,4,5-naphthalenetricarboxylic acid
(38) 2,3,6-naphthalenetricarboxylic acid
(39) 2,3,6-anthraquinonetricarboxylic acid
(40) 3,3′,4-tricarboxybiphenyl
(41) 3,4-dicarboxyphenyl 4′-carboxyphenyl ether
(42) 3,4-dicarboxyphenyl 3′-carboxyphenyl sulfone
(43) 3,3′,4-tricarboxybenzophenone
(44) 2,3,6-pyrdinetricarboxylic acid
(45) 1,2,4-cyclohexanetricarboxylic acid

What is claimed is:

1. A process for the direct preparation of an acid salt of 2,3,5,6-tetraaminopyridine in high purity, said salt being selected from the group consisting of hydrochloride, hydrobromide, trichloroacetate, sulfate, and phosphate salts, which process consists of catalytic reduction of 2,6-diamino - 3,5 - dinitropyridine in an acidic solvent mixture consisting essentially of an inorganic acid selected from the group consisting of HCl, HBr,

$H_2SO_4$ and $H_3PO_4$ and an organic compound selected from the group consisting of acetic acid and the lower alkanols, and recovering the resulting acid salt from said solvent mixture.

2. The process of claim 1 wherein the solvent mixture consists of sulfuric acid in glacial acetic acid.

3. The process of claim 1 wherein the solvent mixture consists of phosphoric acid and methanol.

4. 2,3,5,6-tetraaminopyridine and its acid salts.

5. The compound of claim 4 wherein the acid salt is selected from the group consisting of the hydrochloride, hydrobromide, trichloroacetate, phosphate and sulfate salts of 2,3,5,6-tetraaminopyridine.

References Cited

Klingsberg, Pyridine and Its Derivatives, part 3, Interscience, 1962, pp. 8 and 9.

Elliott et al., J. Org. Chem., vol. 33 (6), pp. 2393–97 (1968).

ALAN L. ROTMAN, Primary Examiner

U.S. Cl. X.R.

260—47 CP, 65, 78 TF, 250 R, 294.8 F, 295 CA, 295 AM, 296 R, 309.2

UNITED STATES PATENT OFFICE
CERTIFICATE OF CORRECTION

Patent No. 3,740,410          Dated June 19, 1973

Inventor(s) Arthur H. Gerber

It is certified that error appears in the above-identified patent and that said Letters Patent are hereby corrected as shown below:

Column 1, line 53; "polybenzimad-" should read --polybenzimid- --

Column 4, line 13 is superfluous

Column 4, line 21; "5:2 v/v" should read --(5:2 by v/v)--

Column 4, line 60; "0-6°C" should read --0-5°C--

Column 5, line 20; "$-\overset{O}{C}CF_3$" should be deleted

Column 5, line 21; "substituents are" should read --substituent is--

Column 5, line 25; "and $-\overset{O}{C}CF_3$" should be deleted

Column 5, line 28; delete "and trifluoroacetic anhydrides, respectively" and insert --anhydride--

Column 5, lines 50 and 51; "(uptake of 9.0 lbs. hydrogen, theoretical is 7.7 lbs. excluding adsorption on catalyst)" should read --(uptake corresponding to a drop of 9 psi hydrogen pressure, theoretical is 7.7 psi excluding adsorption on catalyst)--

Column 6, line 14; should read --reduction in $H_3PO_4-CH_3OH$--

Column 6, line 18; "formic acid saturated with hydrogenchloride" should read --methanol--

Column 6, line 24; "formic acid" should read --methanol--

Column 6, line 46; "After 20 lbs." should read --After 20 psi--

Column 6, line 74; "lbs" should read --psi--

Signed and sealed this 20th day of November 1973.

(SEAL)
Attest:

EDWARD M. FLETCHER, JR.
Attesting Officer

RENE D. TEGTMEYER
Acting Commissioner of Patents